(12) United States Patent
Kimura et al.

(10) Patent No.: US 11,867,926 B2
(45) Date of Patent: Jan. 9, 2024

(54) OPTICAL UNIT

(71) Applicant: NIDEC CORPORATION, Kyoto (JP)

(72) Inventors: Soichiro Kimura, Kyoto (JP); Kazuhiro Sazai, Kyoto (JP); Keishi Otsubo, Kyoto (JP); Tomohiro Egawa, Kyoto (JP); Genki Tanaka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 204 days.

(21) Appl. No.: 17/488,299

(22) Filed: Sep. 29, 2021

(65) Prior Publication Data

US 2022/0099994 A1 Mar. 31, 2022

(30) Foreign Application Priority Data

Sep. 30, 2020 (JP) ................. 2020-165555

(51) Int. Cl.
*G02B 27/64* (2006.01)
*G02B 7/02* (2021.01)

(52) U.S. Cl.
CPC ............. *G02B 27/646* (2013.01); *G02B 7/02* (2013.01)

(58) Field of Classification Search
CPC ......... G02B 27/646; G02B 7/02; G02B 7/023
See application file for complete search history.

(56) References Cited

U.S. PATENT DOCUMENTS

| 8,238,736 | B2 | 8/2012 | Tsuruta et al. | |
|---|---|---|---|---|
| 8,649,672 | B2 | 2/2014 | Takizawa | |
| 8,780,264 | B2 | 7/2014 | Inata et al. | |
| 9,225,899 | B2 | 12/2015 | Takizawa | |
| 9,891,444 | B2 | 2/2018 | Minamisawa | |
| 2013/0128360 | A1* | 5/2013 | Minamisawa | G02B 27/64 359/554 |
| 2013/0182325 | A1* | 7/2013 | Minamisawa | H04N 23/68 359/554 |
| 2014/0028863 | A1* | 1/2014 | Takei | G03B 5/00 348/208.11 |
| 2014/0362242 | A1* | 12/2014 | Takizawa | H04N 23/55 348/208.11 |
| 2020/0326497 | A1 | 10/2020 | Fujisaki et al. | |

FOREIGN PATENT DOCUMENTS

WO WO-2022000554 A1 * 1/2022 ............. G02B 7/02

OTHER PUBLICATIONS

Machine Translation of WO-2022000554-A1 (Year: 2022).*

* cited by examiner

*Primary Examiner* — Darryl J Collins
*Assistant Examiner* — Matthew Y Lee
(74) *Attorney, Agent, or Firm* — HAUPTMAN HAM, LLP

(57) ABSTRACT

An optical unit that corrects a shake of an optical module includes: a movable portion having a holder that holds the optical module; and a fixed portion that rotatably supports the movable portion. The movable portion is rotatable relative to the fixed portion in first-third rotation directions correspondingly centered on first-third axes which correspondingly extend in first-third directions. The first direction is parallel to an optical axis direction of the optical module in a state in which the movable portion is stationary. The first direction, the second direction, and the third direction are perpendicular to each other. The movable portion further includes a protrusion protruding toward the fixed portion from an end of the holder closer to the fixed portion in the optical axis direction. The fixed portion includes a support portion that rotatably supports the protrusion.

20 Claims, 6 Drawing Sheets

OPTICAL UNIT

CROSS-REFERENCE TO RELATED APPLICATIONS

The present invention claims priority under 35 U.S.C. § 119 to Japanese Patent Application No. 2020-165555 filed on Sep. 30, 2020, the entire content of which is incorporated herein by reference.

FIELD OF THE INVENTION

The present invention relates to an optical unit.

BACKGROUND

Some of optical units mounted on imaging devices have a shake correction function. The shake correction function suppresses a disturbance of a captured image when a mobile terminal or a mobile unit moves by swinging a movable portion including a lens to correct a shake.

For example, a camera driving device, which is an example of an optical unit having the shake correction function, includes a movable unit that supports a camera unit and a fixed unit that rotatably supports the movable unit. The fixed unit has a protruding portion whose shape is a part of a spherical surface. The shape of the protruding portion is in contact with a contact surface arranged on the movable unit and having a conical shape. As a result, the movable unit is supported to be rotatable in three-dimensional rotation vectors including a rolling direction, a panning direction, and a tilting direction, with a spherical center of the shape of the protruding portion.

In the above structure, however, the conical shape formed by the contact surface, in contact with the shape of the protruding portion, needs to be deeply recessed in a direction toward the inside of the movable unit along an optical axis of the camera unit in order to make a rotation center of the movable unit coincide with the spherical center of the shape of the protruding portion. Therefore, it is difficult to arrange the camera unit inside the movable unit. For example, there is a case where the camera unit needs to be arranged at an end of the movable unit on a side opposite to the protruding portion in an optical axis direction. Therefore, a size of the device in the optical axis direction increases so that there is a possibility that the device is increased in size.

SUMMARY

An exemplary optical unit of the present invention corrects a shake of an optical module. The optical unit includes a movable portion and a fixed portion. The movable portion includes a holder that holds the optical module. The fixed portion rotatably supports the movable portion. The optical axis direction is a direction in which an optical axis of the optical module extends. A first direction is parallel to the optical axis direction in a state in which the movable portion is stationary. The movable portion is rotatable with respect to the fixed portion in a first rotation direction, a second rotation direction, and a third rotation direction. The first rotation direction is centered on a first axis extending in the first direction. The second rotation direction is centered on a second axis extending in a second direction perpendicular to the first direction. The third rotation direction is centered on a third axis extending in a third direction perpendicular to the first direction and the second direction. The movable portion further includes a protrusion. The protrusion protrudes toward the fixed portion from an end of the holder closer to the fixed portion in the optical axis direction. The fixed portion includes a support portion that rotatably supports the protrusion.

The above and other elements, features, steps, characteristics and advantages of the present disclosure will become more apparent from the following detailed description of the preferred embodiments with reference to the attached drawings.

DETAILED DESCRIPTION

Figure 1:
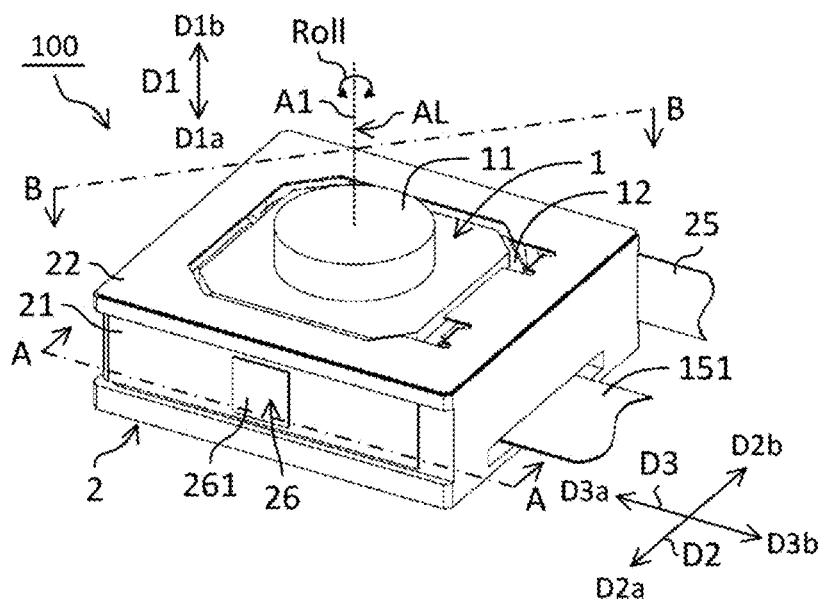
FIG. 1 is a perspective view of an optical unit.

Hereinafter, an exemplary embodiment will be described with reference to the drawings.

Note that, in an optical unit 100, a state in which a movable portion 1, which will be described later, is stopped and a rotation angle of the movable portion 1 with respect to a fixed portion 2 at least in a pitching direction and a yawing direction, which will be described later, is 0 degrees is referred to as "a state in which the movable portion 1 is stationary" in the present specification.

A direction parallel to an optical axis AL of an optical module 11, which will be described later, is referred to as an "optical axis direction DL". In other words, the optical axis direction DL is a direction in which the optical axis AL of the optical module 11 extends. In the optical axis direction DL, a direction from the optical module 11 to a bottom plate portion 122, which will be described later, is referred to as "one side in the optical axis direction DLa", and a direction from the bottom plate portion 122 to the optical module 11 is referred to as "the other side in the optical axis direction DLb". In each component, an end in the one side in the optical axis direction DLa is referred to as "one end in the optical axis direction", and an end in the other side in the optical axis direction DLb is referred to as "the other end in the optical axis direction". In each component, a surface facing the one side in the optical axis direction DLa is referred to as "one end surface in the optical axis direction", and a surface facing the other side in the optical axis direction DLb is referred to as "other end surface in the optical axis direction".

The optical axis AL in the state in which the movable portion 1 is stationary is referred to as a "first axis A1", and a direction in which the first axis A1 extends is referred to as a "first direction D1". Of the first directions D1, a direction from a top cover 22 to a bottom cover 23, which will be described later, is referred to as "one side in the first direction D1a", and a direction from the bottom cover 23 to the top cover 22 is referred to as "the other side in the first direction D1b". In each component, an end on the one side in the first direction D1a is referred to as "one end in the first direction", and an end in the other side in the first direction D1b is referred to as "the other end in the first direction". In each component, a surface facing the one side in the first direction D1a is referred to as "one end surface in the first direction", and a surface facing the other side in the first direction D1b is referred to as "the other end surface in the first direction".

Among axes perpendicular to the first axis A1, an axis passing through a first magnetic attraction plate 261 and a third magnetic attraction plate 263, which will be described later, is referred to as a "second axis A2". The second axis A2 passes through a center of a first coil 241 in a third direction D3, which will be described later, and a center of a third coil 243 in the third direction D3. A direction in which the second axis A2 extends is referred to as a "second direction D2". Of the second directions D2, a direction from the third magnetic attraction plate 263 to the first magnetic attraction plate 261 is referred to as "one side in the second direction D2a", and a direction from the first magnetic attraction plate 261 to the third magnetic attraction plate 263 is referred to as "the other side in the second direction D2b". In each component, an end on the one side in the second direction D2a is referred to as "one end in the second direction", and an end on the other side in the second direction D2b is referred to as "the other end in the second direction". In each component, a surface facing the one side in the second direction D2a is referred to as "one end surface in the second direction", and a surface facing the other side in the second direction D2b is referred to as "the other end surface in the second direction".

An axis that is perpendicular to the first axis A1 and the second axis A2 and passes through a second magnetic attraction plate 262 and a fourth magnetic attraction plate 264, which will be described later, is referred to as a "third axis A3". The third axis A3 passes through a center of a second coil 242, which will be described later, in the second direction D2. A direction in which the third axis A3 extends is referred to as a "third direction D3". Of the third directions D3, a direction from the fourth magnetic attraction plate 264 to the second magnetic attraction plate 262 is referred to as "one side in the third direction D3a", and a direction from the second magnetic attraction plate 262 to the fourth magnetic attraction plate 264 is referred to as "the other side in the third direction D3b". In each component, an end on the one side in the third direction D3a is referred to as "one end in the third direction", and an end on the other side in the third direction D3b is referred to as "the other end in the third direction". In each component, a surface facing the one side in the third direction D3a is referred to as "one end surface in the third direction", and a surface facing the other side in the third direction D3b is referred to as "the other end surface in the third direction".

A circumferential direction centered on the first axis A1 is referred to as a "rolling direction". Note that the rolling direction is an example of a "first rotation direction" of the present invention. The rolling direction is a rotation direction centered on the first axis A1 extending in the first direction D1.

A circumferential direction centered on the second axis A2 is referred to as the "pitching direction". Note that the pitching direction is an example of a "second rotation direction" of the present invention. The pitching direction is a rotation direction centered on the second axis A2 extending in the second direction D2 perpendicular to the first direction D1.

A circumferential direction centered on the third axis A3 is referred to as the "yawing direction". Note that the yawing direction is an example of a "third rotation direction" of the present invention. The yawing direction is a rotation direction centered on the third axis A3 extending in the third direction D3 perpendicular to the first direction D1 and the second direction D2.

A direction orthogonal to a predetermined axis, such as the first axis A1, is referred to as a "radial direction" with such an axis as a reference. Examples of the predetermined axis include the optical axis AL, the first axis A1, the second axis A2, and the third axis A3. Of the radial directions, a direction approaching the predetermined axis is referred to as a "radially inner side", and a direction separating from the predetermined axis is referred to as a "radially outer side". In each component, an end on the radially inner side is referred to as a "radially inner end", and an end on the radially outer side is referred to as a "radially outer end". In each component, a side surface facing radially inward is referred to as a "radially inner side surface", and a side surface facing radially outward is referred to as a "radially outer side surface".

In the positional relationship between any one of the direction, line, and plane and another one of them, the term "parallel" indicates not only a state in which they do not intersect at any point but also a state in which they are substantially parallel. Further, "perpendicular" includes not only a state in which the minimum angle formed by both parts is 90 degrees but also a state in which the both parts are substantially perpendicular. Further, "orthogonal" includes not only a state in which both parts intersect orthogonally with each other but also a state in which both the parts intersect with each other substantially orthogonally. That is, the terms "parallel", "vertical", and "orthogonal" each include a state in which the positional relationship between them has an angular deviation that does not depart from the gist of the present invention.

Note that these are names used merely for the description, and are not intended to limit actual positional relationships, directions, names, and the like.

The optical unit 100 has a shake correction function for correcting a shake of the optical module 11 which will be described later.

Figure 2:
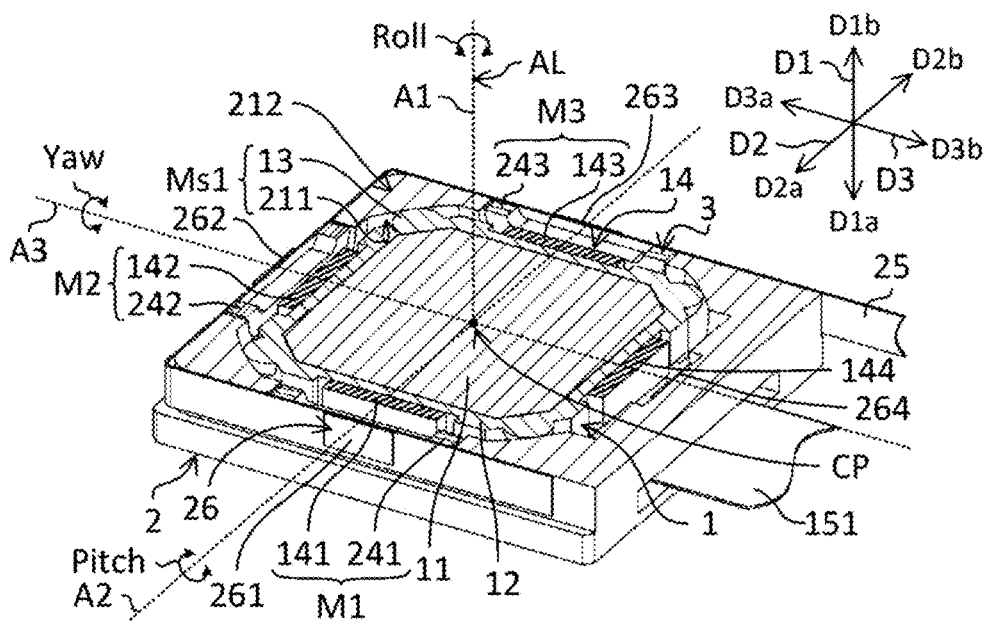
FIG. 2 is a cross-sectional view of the optical unit taken along line A-A.
Figure 3:
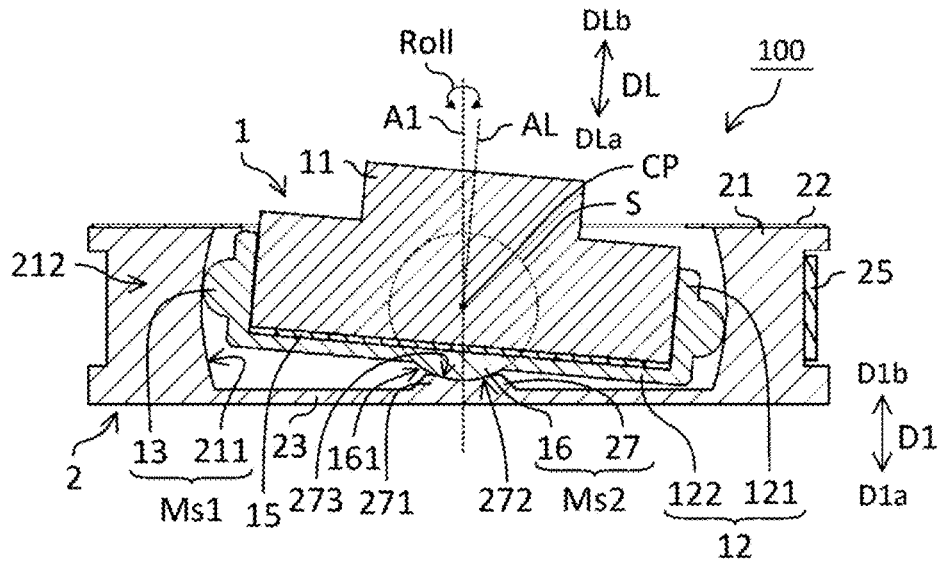
FIG. 3 is a cross-sectional view of the optical unit according to an embodiment taken along line B-B.

FIG. 1 is a perspective view of the optical unit 100. FIG. 2 is a cross-sectional view of the optical unit 100 taken along line A-A. FIG. 3 is a cross-sectional view of the optical unit 100 according to the embodiment taken along line B-B. Note that FIG. 2 is the cross-sectional view taken along the alternate long and short dash line A-A in FIG. 1, and illustrates a cross-sectional structure of the optical unit 100 in the case of being cut along a virtual plane perpendicular to the first axis A1 and including the alternate long and short dash line A-A. FIG. 3 is the cross-sectional view taken along the alternate long and short dash line B-B in FIG. 1, and illustrates a cross-sectional structure of the optical unit 100 in the case of being cut along a virtual plane including the first axis A1 and the alternate long and short dash line B-B. In FIGS. 1 and 2, the movable portion 1 is stationary. In FIG. 3, the movable portion 1 is inclined in the pitching direction and/or the yawing direction. In FIGS. 1 to 3, the sign of the rolling direction is "Roll", the sign of the pitching direction is "Pitch", and the sign of the yawing direction is "Yaw". The same applies to the other drawings.

The optical unit 100 includes the movable portion 1 and the fixed portion 2. The optical unit 100 is mounted on a smartphone with a camera, an imaging device such as a photo camera and a video camera, an action camera mounted on a mobile unit such as a drone, and the like. When the movable portion 1 tilts from the vertical direction, the optical unit 100 corrects the tilt of the movable portion 1 on the basis of detection results such as acceleration, angular velocity, and deflection amount in the three-dimensional direction detected by a sensor such as a gyroscope (not shown), and the deflection of the optical axis AL of the optical module 11 of the movable portion 1 is corrected.

The optical unit 100 further includes a first magnetic drive mechanism M1, a second magnetic drive mechanism M2, a third magnetic drive mechanism M3, a first support mechanism Ms1, a second support mechanism Ms2, and a separation suppressing portion 4. These configurations will be described later.

First, a configuration of the swingable movable portion 1 will be described with reference to FIGS. 1 to 3. Note that the swing of the movable portion 1 means that the movable portion 1 rotates within a predetermined rotation angle range in the rolling direction, the pitching direction, and the yawing direction. That is, the movable portion 1 is rotatable with respect to the fixed portion 2 in the rolling direction, the pitching direction, and the yawing direction.

Preferably, at least one of the first axis A1 which is the rotation center in the rolling direction, the second axis A2 which is the rotation center in the pitching direction, and the third axis A3 which is the rotation center in the yawing direction passes through the optical axis AL. Note that the expression that an axis "passes through the optical axis AL" means that the axis intersects with the optical axis AL including one point on the optical axis AL. In this manner, when the movable portion 1 rotates in at least one of the rolling direction, the pitching direction, and the yawing direction, the optical axis AL of the optical module 11 can be prevented from deviating.

More preferably, the second axis A2 and the third axis A3 are orthogonal to each other on the first axis A1. In the present embodiment, the first axis A1, the second axis A2, and the third axis A3 are orthogonal to each other at a position CP on the first axis A1. Hereinafter, this position is referred to as a rotation center position CP. That is, the rotation center position CP is a position serving as a rotation center when the movable portion 1 rotates. Then, the movable portion 1 can smoothly perform three-dimensional rotation with an intersection among the three axes as the rotation center position CP.

However, the above-described example does not exclude a configuration in which all of the first axis A1, the second axis A2, and the third axis A3 deviate from the optical axis AL and do not intersect with each other, and does not exclude a configuration in which at least one of the second axis A2 and the third axis A3 deviates from the first axis A1 and does not intersect with the first axis A1.

Next, the movable portion 1 includes the optical module 11, a holder 12, a plurality of side protrusions 13, a driving magnet 14, a plate-like substrate 15, a flexible printed circuit board 151 having flexibility, and a protrusion 16. Note that a configuration of the protrusion 16 will be described later.

In the present embodiment, the optical module 11 is a camera module having a lens. In the present embodiment, a planar shape of the optical module 11 as viewed from the first direction D1 is rectangular.

The holder 12 holds the optical module 11. As described above, the movable portion 1 further includes the holder 12. In the present embodiment, the holder 12 is made of resin, and accommodates at least a portion of the optical module 11 on the one side in the optical axis direction DLa. The holder 12 includes a peripheral wall portion 121 and a bottom plate portion 122. The peripheral wall portion 121 is arranged on the radially outer side of the optical module 11 in the radial direction with the optical axis AL as a reference, and surrounds the optical module 11 in the circumferential direction centered on the optical axis direction DL. In the present embodiment, the peripheral wall portion 121 has a tubular shape extending in the optical axis direction DL, and is a rectangular frame-shaped member when viewed from the optical axis direction DL. The bottom plate portion 122 is arranged closer to the one side in the optical axis direction DLa than the optical module 11 and expands in the radial direction with the optical axis direction DL as a reference. The radially outer end of the bottom plate portion 122 with the optical axis AL as the reference is connected to the peripheral wall portion 121.

The side protrusion 13 is made of resin in the present embodiment, and is arranged on the radially outer side surface of the holder 12. Specifically, the side protrusion 13 is arranged on the radially outer side surface of a corner portion (whose reference sign is omitted) of the rectangular peripheral wall portion 121 as viewed in the optical axis direction DL. The side protrusion 13 protrudes to the radially outer side from the peripheral wall portion 121 in the radial direction with the optical axis AL as the reference. The side protrusion 13 is in contact with a concave surface 211, which will be described later, of the fixed portion 2 and is movable on the concave surface 211. Each of the side protrusions 13 moves on the concave surface 211 while being in contact with the concave surface 211, so that the movable portion 1 can rotate with respect to the fixed portion 2 while being kept supported by the fixed portion 2.

Each of the side protrusions 13 forms the first support mechanism Ms1 together with each of the concave surfaces 211 of the fixed portion 2. That is, each of the first support mechanisms Ms1 includes the side protrusion 13 and the concave surface 211. Note that the number of the first support mechanisms Ms1 is four in the present embodiment, but is not limited to this example, and may be plural such as three and five or more. Each of the first support mechanisms Ms1 rotatably supports the movable portion 1 with respect to the fixed portion 2 in either the second direction D2 or the third direction D3.

In the present embodiment, the side protrusion 13 is a part different from the peripheral wall portion 121 in the same member. However, the present invention is not limited to this example, and the side protrusion 13 may be a separate body from the peripheral wall portion 121. The side protrusion 13 has a curved surface (whose reference sign is omitted) protruding to the radially outer side with the optical axis AL as the reference. This curved surface preferably has a partial shape of a spherical surface (not illustrated).

Next, the driving magnet 14 includes a first driving magnet 141, a second driving magnet 142, and a third driving magnet 143.

The first driving magnet 141 is a magnet for driving the movable portion 1 to rotate in the rolling direction. In the present embodiment, the first driving magnet 141 has a plate shape, and expands in a direction perpendicular to the radial direction passing through the first driving magnet 141 with the optical axis direction DL as the reference. The first driving magnet 141 is polarized in a direction perpendicular to both the optical axis direction DL and the radial direction passing through the first driving magnet 141 with the optical axis direction DL as the reference. In other words, for example, a portion on one side in the above-described perpendicular direction is an N pole, and a portion on the other side in the above-described perpendicular direction is an S pole, in the first driving magnet 141.

As illustrated in FIG. 2, the first driving magnet 141 is arranged at the radially outer end of the peripheral wall portion 121 on the one side in the second direction D2a. More specifically, a first magnet holding hole (whose reference sign is omitted), recessed toward the other side in the second direction D2b, is arranged at the radially outer end of the peripheral wall portion 121 on the one side in the second direction D2a. At least a part of the first driving magnet 141 is accommodated in the first magnet holding hole together with a first yoke (not illustrated). However, the present invention is not limited to this example, and the first driving magnet 141 and the first yoke may be fixed to the radially outer side surface of the peripheral wall portion 121 on the one side in the second direction D2a. The first yoke may be omitted.

The second driving magnet 142 is a magnet for driving the movable portion 1 to rotate in the pitching direction. In the present embodiment, the second driving magnet 142 has a plate shape, and expands in a direction perpendicular to the radial direction passing through the second driving magnet 142 with the optical axis direction DL as the reference. The second driving magnet 142 is polarized in the optical axis direction DL. That is, in the second driving magnet 142, one of a portion on the one side in the optical axis direction DLa and a portion on the other side in the optical axis direction DLb is the N pole, and the other of the portion on the one side in the optical axis direction DLa and the portion on the other side in the optical axis direction DLb is the S pole.

As illustrated in FIG. 2, the second driving magnet 142 is arranged at the radially outer end of the peripheral wall portion 121 on the one side in the third direction D3a. More specifically, a second magnet holding hole (whose reference sign is omitted), recessed toward the other side in the third direction D3b, is arranged at the radially outer end of the peripheral wall portion 121 on the one side in the third direction D3a. At least a part of the second driving magnet 142 is accommodated in the second magnet holding hole together with a second yoke (not illustrated). However, the present invention is not limited to this example, and the second driving magnet 142 and the second yoke may be fixed to the radially outer side surface of the peripheral wall portion 121 on the one side in the third direction D3a. The second yoke may be omitted.

The third driving magnet 143 is a magnet for driving the movable portion 1 to rotate in the yawing direction. In the present embodiment, the third driving magnet 143 has a plate shape, and expands in a direction perpendicular to the radial direction passing through the third driving magnet 143 with the optical axis direction DL as the reference. Each of the third driving magnets 143 is polarized in the optical axis direction DL. That is, in the third driving magnet 143, one of a portion on the one side in the optical axis direction DLa and a portion on the other side in the optical axis direction DLb is the N pole, and the other of the portion on the one side in the optical axis direction DLa and the portion on the other side in the optical axis direction DLb is the S pole.

As illustrated in FIG. 2, the third driving magnet 143 is arranged at the radially outer end of the peripheral wall portion 121 on the other side in the second direction D2b. More specifically, a third magnet holding hole (whose reference sign is omitted), recessed toward the one side in the second direction D2a, is arranged at the radially outer end of the peripheral wall portion 121 on the other side in the second direction D2b. At least a part of the third driving magnet 143 is accommodated in the third magnet holding hole together with a third yoke (not illustrated). However, the present invention is not limited to this example, and the third driving magnet 143 and the third yoke may be fixed to the radially outer side surface of the peripheral wall portion 121 on the other side in the second direction D2b. The third yoke may be omitted.

In the present embodiment, the driving magnet 14 further includes a fourth driving magnet 144. The fourth driving magnet 144 is a magnet for assisting in maintaining the orientation of the movable portion 1 with respect to the fixed portion 2. The fourth driving magnet 144 may be polarized in a direction perpendicular to both the optical axis direction DL and the radial direction passing through the fourth driving magnet 144 with the optical axis direction DL as the reference. Alternatively, the fourth driving magnet 144 may be polarized in the radial direction with the optical axis direction DL as the reference, or may be polarized in the optical axis direction DL.

As illustrated in FIG. 2, the fourth driving magnet 144 is arranged at the radially outer end of the peripheral wall portion 121 on the other side in the third direction D3b. More specifically, a fourth magnet holding hole (whose reference sign is omitted), recessed toward the one side in the third direction D3a, is arranged at the radially outer end of the peripheral wall portion 121 on the other side in the third direction D3b. At least a part of the fourth driving magnet 144 is accommodated in the fourth magnet holding hole together with a fourth yoke (not illustrated). However, the present invention is not limited to this example, and the fourth driving magnet 144 and the fourth yoke may be fixed to the radially outer side surface of the peripheral wall portion 121 on the other side in the third direction D3b. The fourth yoke may be omitted. Note that the present invention is not limited to the example of the present embodiment, and the driving magnet 14 does not necessarily include the fourth driving magnet 144.

Next, the substrate 15 is arranged between the optical module 11 and the bottom plate portion 122, and expands in a direction perpendicular to the optical axis AL. For example, a power supply circuit and a drive circuit of the optical module 11 are mounted on the substrate 15.

The flexible printed circuit board 151 extends to the other side in the third direction D3b from the other end in the third direction of the circuit board 15 and is led out to the outside of the optical unit 100. The flexible printed circuit board 151 electrically connects the optical module 11 to an apparatus, a device, a circuit, or the like arranged outside the optical unit 100 through the substrate 15.

Next, a configuration of the fixed portion 2 will be described. The fixed portion 2 rotatably supports the movable portion 1. As described above, the optical unit 100 includes the fixed portion 2. The fixed portion 2 includes a frame body 21, the top cover 22, the bottom cover 23, a coil 24, a flexible printed circuit board 25 having flexibility, and a magnetic attraction plate 26.

The frame body 21 is arranged on the radially outer side of the movable portion 1 in the radial direction with the first axis A1 as the reference, and surrounds the holder 12 of the movable portion 1 in the circumferential direction centered on the first axis A1. The optical unit 100 includes the frame body 21. In the present embodiment, the frame body 21 is made of resin and has a tubular shape extending in the first direction D1.

The frame body 21 has the plurality of concave surfaces 211. The concave surface 211 is arranged on the radially inner side surface of the frame body 21. The concave surface 211 opposes the side protrusion 13 of the movable portion 1 in the radial direction passing through the concave surface 211 with the first direction D1 as a reference, and is in contact with the curved surface of the side protrusion 13. The respective concave surfaces 211 have mutually different partial shapes of the same spherical surface (not illustrated) centered on the rotation center position CP of the movable portion 1. Therefore, when the movable portion 1 rotates with respect to the fixed portion 2, the side protrusion 13 of the movable portion 1 can move on the concave surface 211 without being caught while being in contact with the concave surface 211.

When viewed from the first direction D1, a planar shape of the frame body 21 is a polygonal shape, and the frame body 21 has a plurality of corner portions 212. For example, the planar shape of the frame body 21 is rectangular, and the frame body 21 has four corner portions 212, in the present embodiment. The concave surface 211 is arranged at the radially inner end of the frame body 21 in the corner portion 212. That is, the first support mechanism Ms1 is arranged on each of the corner portions 212. Then, a size of the fixed portion 2 can be further reduced as compared with a configuration in which the first support mechanism Ms1 is arranged in a portion other than the corner portion 212 of the frame body 21. This can contribute to downsizing of the optical unit 100.

The top cover 22 is arranged at the other end in the first direction of the frame body 21. An opening (whose reference sign is omitted) penetrating in the first direction D1 is arranged at the center of the top cover 22. A part of the optical module 11 (for example, the lens of the camera module) is exposed to the outside of the optical unit 100 through the opening.

The bottom cover 23 has a plate shape expanding in the radial direction with the first axis A1 as the reference. The bottom cover 23 is arranged at one end in the first direction of the frame body 21. The bottom cover 23 is made of resin in the present embodiment. However, the present invention is not limited to this example, and the bottom cover 23 may be made of, for example, metal such as Al. The radially outer end of the bottom cover 23 is connected to one end in the first direction of the frame body 21. In the present embodiment, the bottom cover 23 is a different part of the same member as the frame body 21. However, the present invention is not limited to this example, and the bottom cover 23 may be a separate body from the frame body 21.

The bottom cover 23 includes a support portion 27 that rotatably supports the movable portion 1. The support portion 27 on the fixed portion 2 side forms the second support mechanism Ms2 together with the protrusion 16 on the movable portion 1 side. A configuration of the support portion 27 will be described later.

Next, the coil 24 includes the first coil 241, the second coil 242, and the third coil 243.

The first coil 241 is arranged in a portion of the frame body 21 on the one side in the second direction D2a and opposes the first driving magnet 141 in the second direction D2. More specifically, a first coil holding hole (whose reference sign is omitted), recessed toward the one side in the second direction D2a, is arranged at the radially inner end of the portion of the frame body 21 on the one side in the second direction D2a. At least a part of the first coil 241 is accommodated in the first coil holding hole. Note that the present invention is not limited to the example of the present embodiment, and the first coil holding hole may be arranged at the radially outer end of the above-described portion, and be recessed to the other side in the second direction D2b.

Alternatively, the first coil holding hole may penetrate the above-described portion in the second direction D2. Alternatively, the first coil 241 may be fixed to any one of the radially inner side surface and the radially outer side surface of the above-described portion of the frame body 21.

As illustrated in FIG. 2, the first coil 241 forms a first magnetic drive mechanism M1 together with the first driving magnet 141. The first magnetic drive mechanism M1 generates a driving force for rotating the movable portion 1 in the rolling direction by energization of the first coil 241. The optical unit 100 appropriately rotates the movable portion 1 by the driving force of the first magnetic drive mechanism M1 to perform shake correction of the optical axis AL of the optical module 11 in the rolling direction, for example.

The second coil 242 is arranged in a portion of the frame body 21 on the one side in the third direction D3a and opposes the second driving magnet 142 in the third direction D3. More specifically, a second coil holding hole (whose reference sign is omitted), recessed toward the one side in the third direction D3a, is arranged at the radially inner end of the portion of the frame body 21 on the one side in the third direction D3a. At least a part of the second coil 242 is accommodated in the second coil holding hole. Note that the present invention is not limited to the example of the present embodiment, and the second coil holding hole may be arranged at the radially outer end of the above-described portion, and be recessed to the other side in the third direction D3b.

Alternatively, the second coil holding hole may penetrate the above-described portion in the third direction D3. Alternatively, the second coil 242 may be fixed to any one of the radially inner side surface and the radially outer side surface of the above-described portion of the frame body 21.

As illustrated in FIG. 2, the second coil 242 forms the second magnetic drive mechanism M2 together with the second driving magnet 142. The second magnetic drive mechanism M2 generates a driving force for rotating the movable portion 1 in the pitching direction by energization of the second coil 242. The optical unit 100 appropriately rotates the movable portion 1 by the driving force of the second magnetic drive mechanism M2 to perform shake correction of the optical axis AL of the optical module 11 in the pitching direction, for example.

The third coil 243 is arranged in a portion of the frame body 21 on the other side D2b in the second direction, and opposes the third driving magnet 143 in the second direction D2. More specifically, a third coil holding hole (whose reference sign is omitted), recessed toward the other side in the second direction D2b, is arranged at the radially inner end of the portion of the frame body 21 on the other side in the second direction D2b. At least a part of the third coil 243 is accommodated in the third coil holding hole. Note that the present invention is not limited to the example of the present embodiment, and the third coil holding hole may be arranged at the radially outer end of the above-described portion, and be recessed to the one side in the second direction D2*a*. Alternatively, the third coil holding hole may penetrate the above-described portion in the second direction D2. Alternatively, the third coil 243 may be fixed to any one of the radially inner side surface and the radially outer side surface of the above-described portion of the frame body 21.

As illustrated in FIG. 2, the third coil 243 forms the third magnetic drive mechanism M3 together with the third driving magnet 143. The third magnetic drive mechanism M3 generates a driving force for rotating the movable portion 1 in the yawing direction by energization of the third coil 243. The optical unit 100 appropriately rotates the movable portion 1 by the driving force of the third magnetic drive mechanism M3 to perform shake correction of the optical axis AL of the optical module 11 in the yawing direction, for example.

Note that the driving magnet 14 is arranged in the movable portion 1, and the coil 24 is arranged in the fixed portion 2, in the first magnetic drive mechanism M1, the second magnetic drive mechanism M2, and the third magnetic drive mechanism M3 in the present embodiment. However, the present invention is not limited to this example, and the driving magnet 14 may be arranged in the fixed portion 2, and the coil 24 may be arranged in the movable portion 1, in at least one of the first magnetic drive mechanism M1, the second magnetic drive mechanism M2, and the third magnetic drive mechanism M3.

Next, the flexible printed circuit board 25 is arranged on the radially outer side surface of the frame body 21. Specifically, the flexible printed circuit board 25 is arranged on one end surface in the second direction, one end surface in the third direction, and the other end surface in the second direction of the frame body 21. The flexible printed circuit board 25 electrically connects the coil 24 to an apparatus, a device, a circuit, or the like arranged outside the optical unit 100.

The magnetic attraction plate 26 is a magnetic body arranged on the frame body 21. The magnetic attraction plate 26 is arranged on the radially outer side surface of the frame body 21 with the flexible printed circuit board 25 interposed therebetween, and opposes the driving magnet 14 in the radial direction with the first direction D1 as the reference. Note that the magnetic attraction plate 26 is electrically insulated from the flexible printed circuit board 25. The magnetic attraction plate 26 magnetically attracts the driving magnet 14 to assist maintaining of the orientation of the movable portion 1 with respect to the fixed portion 2. The magnetic attraction plate 26 includes the first magnetic attraction plate 261, the second magnetic attraction plate 262, the third magnetic attraction plate 263, and the fourth magnetic attraction plate 264.

The first magnetic attraction plate 261 is arranged on the one end surface in the second direction of the frame body 21 with the flexible printed circuit board 25 interposed therebetween. In the present embodiment, the first magnetic attraction plate 261 has a plate shape, and expands in a direction perpendicular to the radial direction passing through the first magnetic attraction plate 261 with the first direction D1 as the reference. The first magnetic attraction plate 261 opposes the first driving magnet 141 in the second direction D2 and magnetically attracts the first driving magnet 141.

The second magnetic attraction plate 262 is arranged on the one end surface in the third direction of the frame body 21 with the flexible printed circuit board 25 interposed therebetween. In the present embodiment, the second magnetic attraction plate 262 has a plate shape, and expands in a direction perpendicular to the radial direction passing through the second magnetic attraction plate 262 with the first direction D1 as the reference. The second magnetic attraction plate 262 opposes the second driving magnet 142 in the third direction D3 and magnetically attracts the second driving magnet 142.

The third magnetic attraction plate 263 is arranged on the other end surface in the second direction of the frame body 21 with the flexible printed circuit board 25 interposed therebetween. In the present embodiment, the third magnetic attraction plate 263 has a plate shape, and expands in a direction perpendicular to the radial direction passing through the third magnetic attraction plate 263 with the first direction D1 as the reference. The third magnetic attraction plate 263 opposes the third driving magnet 143 in the second direction D2 and magnetically attracts the third driving magnet 143.

The fourth magnetic attraction plate 264 is arranged at the other end in the third direction of the frame body 21 with the flexible printed circuit board 25 interposed therebetween. In the present embodiment, the fourth magnetic attraction plate 264 has a plate shape, and expands in a direction perpendicular to the radial direction passing through the fourth magnetic attraction plate 264 with the first direction D1 as the reference. Further, in the present embodiment, the fourth magnetic attraction plate 264 is arranged on the radially inner side surface in a portion closer to the other side in the third direction D3*b* than the movable portion 1 of the frame body 21. The fourth magnetic attraction plate 264 opposes the fourth driving magnet 144 in the third direction D3 and magnetically attracts the fourth driving magnet 144.

At least one of the first magnetic attraction plate 261, the second magnetic attraction plate 262, the third magnetic attraction plate 263, and the fourth magnetic attraction plate 264 may be omitted.

Figure 4:
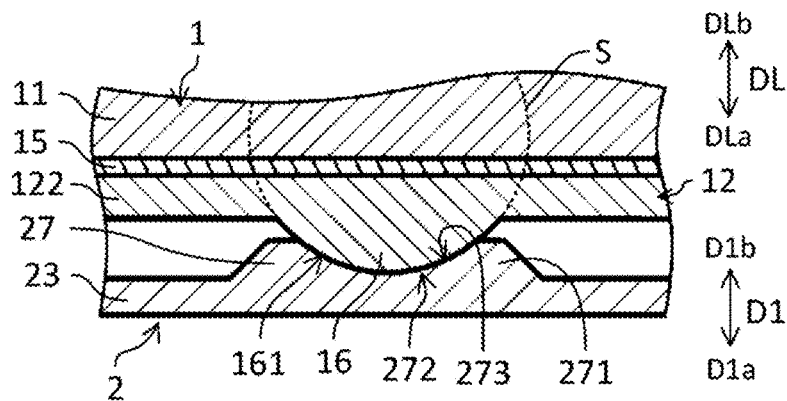
FIG. 4 is a cross-sectional view illustrating a configuration example of a second support mechanism according to the embodiment.

Next, a configuration of the second support mechanism Ms2 will be described with reference to FIG. 4. FIG. 4 is a cross-sectional view illustrating a configuration example of the second support mechanism Ms2 according to the embodiment. Note that FIG. 4 corresponds to, for example, an enlarged view of the vicinity of the second support mechanism Ms2 in the cross-sectional view of FIG. 3, and illustrates a cross-sectional structure in a state in which the movable portion 1 is stationary.

The second support mechanism Ms2 rotatably supports the movable portion 1 with respect to the fixed portion 2 between the bottom plate portion 122 of the holder 12 and the bottom cover 23. As illustrated in FIG. 4, the second support mechanism Ms2 includes the protrusion 16 and the support portion 27. The protrusion 16 is arranged at one end in the optical axis direction of the bottom plate portion 122 of the holder 12. As described above, the movable portion 1 has the protrusion 16. The protrusion 16 protrudes toward the fixed portion 2 from an end of the holder 12 closer to the fixed portion 2 in the optical axis direction DL in which the optical axis AL of the optical module 11 extends. That is, the protrusion 16 protrudes from the bottom plate portion 122 of the holder 12 to the one side in the optical axis direction DLa. The support portion 27 is arranged at the other end in the optical axis direction of the bottom cover 23 of the fixed portion 2.

As described above, the fixed portion 2 includes the support portion 27. The support portion 27 rotatably supports the protrusion 16.

In the second support mechanism Ms2, the protrusion 16 of the movable portion 1, rotatably supported by the support portion 27 of the fixed portion 2, protrudes from the end of the holder 12 closer to the fixed portion 2 in the optical axis direction DL. Therefore, the support portion 27 of the fixed portion 2 can rotatably support the protrusion 16 of the movable portion 1 without greatly increasing the size of the optical unit 100 in the first direction D1. Therefore, it is possible to suppress the increase in size of the optical unit 100.

If the movable portion 1 does not have the protrusion 16, there is a gap between the movable portion 1 and the fixed portion 2 in the first direction D1. Therefore, there is a possibility that the entire movable portion 1 moves toward the support portion 27 of the fixed portion 2 due to its own weight or the like, and a three-dimensional rotation center of the optical axis AL deviates toward, for example, the support portion 27. On the other hand, since the movable portion 1 is in contact with the fixed portion 2 via the protrusion 16 according to the above configuration, it is possible to suppress the entire movable portion 1 from moving toward the support portion 27 of the fixed portion 2. Therefore, it is possible to suppress the deviation of the three-dimensional rotation center position CP of the movable portion 1 due to the movement of the entire movable portion 1 toward the support portion 27 of the fixed portion 2.

Further, it is possible to prevent a state where it is difficult to arrange the optical module 11 inside the movable portion 1 by arranging the protrusion 16 on the movable portion 1 according to the above-described second support mechanism Ms2. That is, it is unnecessary to provide the second support mechanism Ms2 inside the movable portion 1, and thus, the optical module 11 can be arranged in the further inner side of the movable portion 1.

Next, the configuration of the protrusion 16 will be described with reference to FIG. 4.

Preferably, the protrusion 16 is made of resin. The support portion 27 is made of resin in the present embodiment, but may be made of metal. Then, when the movable portion 1 rotates with respect to the support portion 27, the protrusion 16 can smoothly rotate with respect to the support portion 27 while being in contact with the support portion 27 as compared with a case where the protrusion 16 is made of metal. On the other hand, for example, when the protrusion 16 is made of metal, there is a possibility that the support portion 27 made of resin is scraped. Alternatively, when the support portion 27 is made of metal, there is a possibility that the protrusion 16 is baked with the support portion 27. Note that these examples do not exclude the configuration in which the protrusion 16 is made of metal.

The protrusion 16 has a first curved surface 161. The first curved surface 161 protrudes toward the support portion 27 and is in contact with the support portion 27. The first curved surface 161 is arranged at one end in the optical axis direction of the protrusion 16. Preferably, the first curved surface 161 has a partial shape of a spherical surface S. Then, the rotation center position CP of the movable portion 1 can be prevented from moving when the movable portion 1 rotates with respect to the fixed portion 2. Further, it is possible to suppress or prevent a change in distance between a curvature center of the first curved surface 161 and the support portion 27 in the first direction D1. Therefore, it is possible to suppress or prevent the entire movable portion 1 from moving toward the support portion 27 of the fixed portion 2.

More preferably, the curvature center of the first curved surface 161 is arranged on the optical axis AL. Then, when the movable portion 1 rotates about the curvature center of the first curved surface 161 as the rotation center, the optical axis AL of the optical module 11 can be prevented from deviating.

Preferably, the curvature center of the first curved surface 161 is arranged on at least one of the first axis A1, the second axis A2, and the third axis A3. Then, the movable portion 1 can smoothly rotate in the rotation direction about at least one of the above axes, and the deviation of the three-dimensional rotation center of the optical axis AL due to the rotation of the movable portion 1 can be prevented.

In the present embodiment, the curvature center of the first curved surface 161 coincides with the rotation center position CP of the movable portion 1, and is arranged on all the axes of the first axis A1, the second axis A2, and the third axis A3 (see, for example, FIGS. 2 and 3). However, the above example does not exclude a configuration in which the curvature center of the first curved surface 161 does not coincide with the rotation center position CP of the movable portion 1 and a configuration in which the curvature center of the first curved surface 161 deviates from all the axes of the first axis A1, the second axis A2, and the third axis A3. Further, the present invention is not limited to the above example, and the first curved surface 161 does not necessarily have a partial shape of the spherical surface S.

Next, the configuration of the support portion 27 will be described with reference to FIG. 4. The support portion 27 includes a base 271 and a recess 272.

The base 271 is arranged at the other end in the first direction of the bottom cover 23 and protrudes from the bottom cover 23 to the other side in the first direction D1b. Since the base 271 is provided as described above, a place where the support portion 27 and the protrusion 16 are in contact with each other can be set at a position separated from the bottom cover 23 in the optical axis direction. As a result, a rotatable range of the movable portion 1 in the pitching direction and the yawing direction can be increased. When the recess 272 to be described later is provided, the thickness of the support portion 27 in the vicinity of the recess 272 can be further increased. Thus, particularly when the support portion 27 is made of resin, it is possible to suppress deformation of the support portion 27 due to a drop impact or the like.

The recess 272 is arranged at the other end in the first direction of the base 271. The recess 272 is recessed to the one side in the first direction D1a to accommodate the protrusion 16. As described above, the support portion 27 has the recess 272. Note that the one side in the first direction D1a is directed similarly to the side closer to the fixed portion 2 in the optical axis direction DL (that is, the one side in the optical axis directions DLa) in the state in which the movable portion 1 is stationary. In other words, the recess 272 is recessed in a direction separated from the protrusion 16 to accommodate the protrusion 16. In the present embodiment, the protrusion 16 is in contact with an inner surface of the recess 272. Since the protrusion 16 of the movable portion 1 is accommodated in the recess 272 of the support portion 27, it is possible to prevent the movable portion 1 from deviating in a direction intersecting with the first direction D1 when the movable portion 1 rotates with respect to the support portion 27.

The recess 272 has a second curved surface 273. The second curved surface 273 is recessed in a direction separated from the protrusion 16 and is in contact with the protrusion 16. The direction separated from the protrusion 16 is, for example, the one side in the first direction D1a. The second curved surface 273 is the inner surface of the recess 272 in the present embodiment. Preferably, the second curved surface 273 has a partial shape of the spherical surface S. Then, the rotation center position CP of the movable portion 1 can be prevented from moving when the movable portion 1 rotates with respect to the support portion 27 of the fixed portion 2. Further, it is possible to suppress or prevent a change in distance between a curvature center of the spherical surface S and the support portion 27 in the first direction D1. Therefore, it is possible to suppress or prevent the entire movable portion 1 from moving toward the support portion 27 of the fixed portion 2.

Preferably, the curvature center of the second curved surface 273 is located at the same position as the curvature center of the first curved surface 161. In the present embodiment, the curvature centers of the second curved surface 273 and the first curved surface 161 are at the rotation center position CP of the movable portion 1. Then, when the movable portion 1 rotates about the curvature centers of the both as the rotation center, the optical axis AL of the optical module 11 can be prevented from deviating. When both the first curved surface 161 and the second curved surface 273 have a partial shape of the same spherical surface S, the movable portion 1 rotates with respect to the support portion 27 of the fixed portion 2 in a state in which the first curved surface 161 and the second curved surface 273 are in surface contact with each other. Therefore, it is possible to prevent the optical axis AL of the optical module 11 more effectively from deviating when the movable portion 1 rotates.

More preferably, the curvature center of the second curved surface 273 is arranged on the optical axis AL. Then, when the movable portion 1 rotates about the curvature center of the second curved surface 273 as the rotation center, the optical axis AL of the optical module 11 can be more effectively prevented from deviating.

Preferably, the curvature center of the second curved surface 273 is arranged on at least one of the first axis A1, the second axis A2, and the third axis A3. Then, the movable portion 1 can smoothly rotate in the rotation direction about at least one of the above axes, and the deviation of the three-dimensional rotation center of the optical axis AL due to the rotation of the movable portion 1 can be prevented. In the present embodiment, the curvature center of the second curved surface 273 coincides with the rotation center position CP of the movable portion 1, and is arranged on all the axes of the first axis A1, the second axis A2, and the third axis A3. However, the present invention is not limited to these examples, and the curvature center of the second curved surface 273 does not necessarily coincide with the rotation center position CP of the movable portion 1. Further, the curvature center of the second curved surface 273 may deviate from all the axes of the first axis A1, the second axis A2, and the third axis A3.

Figure 5A:
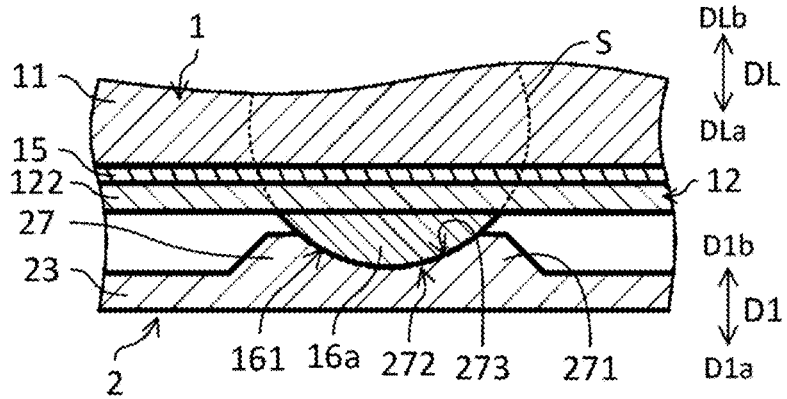
FIG. 5A is a first modification of a protrusion.
Figure 5B:
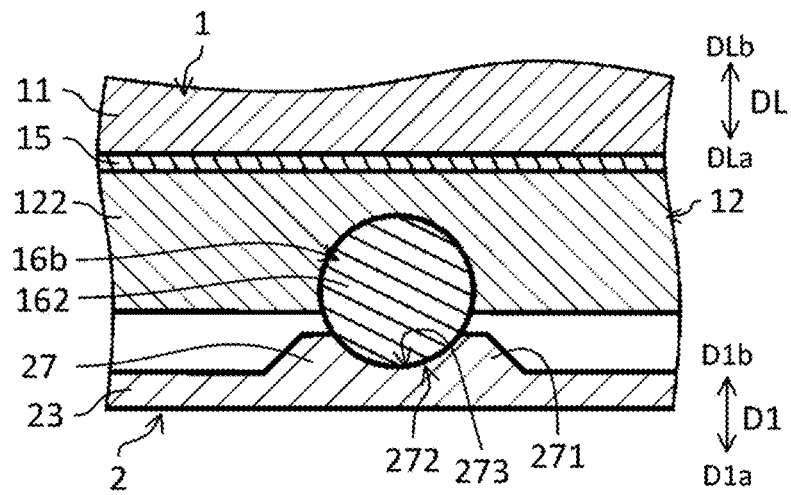
FIG. 5B is a second modification of the protrusion.

In FIG. 4, the protrusion 16 is a different part of the same member as the holder 12. However, the present invention is not limited to the example of FIG. 4, and the protrusion 16 may be a member different from the holder 12 as illustrated in FIGS. 5A and 5B, for example. FIG. 5A illustrates a first modification of the protrusion 16. FIG. 5B illustrates a second modification of the protrusion 16. Note that each of FIGS. 5A and 5B corresponds to, for example, an enlarged view of the vicinity of the second support mechanism Ms2 in the cross-sectional view of FIG. 3, and illustrates a cross-sectional structure in a state in which the movable portion 1 is stationary.

In FIG. 5A, a protrusion 16a, which is a separate body from the holder 12, is attached to one end in the optical axis direction of the holder 12. The first curved surface 161 protruding to the one side in the optical axis direction is arranged at one end in the optical axis direction of the protrusion 16a. Note that the first curved surface 161 may have a partial shape of the spherical surface S as illustrated in FIG. 5A, or does not necessarily have a partial shape of the spherical surface S. A plane expanding in a direction perpendicular to the optical axis AL is arranged at the other end in the optical axis direction of the protrusion 16a. This plane is in contact with the one end in the optical axis direction of the holder 12. For example, the protrusion 16a may be attached to the holder 12 using an adhesive, or may be screwed to the holder 12. Alternatively, the protrusion 16a may be fixed to the one end in the optical axis direction of the holder 12 by a mounting member (not illustrated).

In FIG. 5B, a protrusion 16b has a sphere 162. The sphere 162 is embedded in the one end in the optical axis direction of the holder 12. Such a structure can be realized, for example, by integrally molding the sphere 162 with the bottom plate portion 122 at the time of manufacturing the holder 12. However, the present invention is not limited to the example of FIG. 5B, and, for example, a part of the sphere 162 may be accommodated in a hole (not illustrated) arranged at the one end in the optical axis direction of the holder 12. In this case, the remaining part of the sphere 162 can be exposed from the one end in the optical axis direction of the holder 12 through an opening by closing the hole with a lid (not illustrated) having the opening. Note that the sphere 162 may be fixed to the holder 12 or may be rotatable with respect to the holder 12.

As described above, the protrusions 16a and 16b may be members different from the holder 12. Then, it is unnecessary to form the protrusion 16 by precision processing. For example, it is unnecessary to form a partial shape of the spherical surface S at the one end in the optical axis direction of the holder 12. Therefore, the movable portion 1 can be easily manufactured.

Figure 6A:
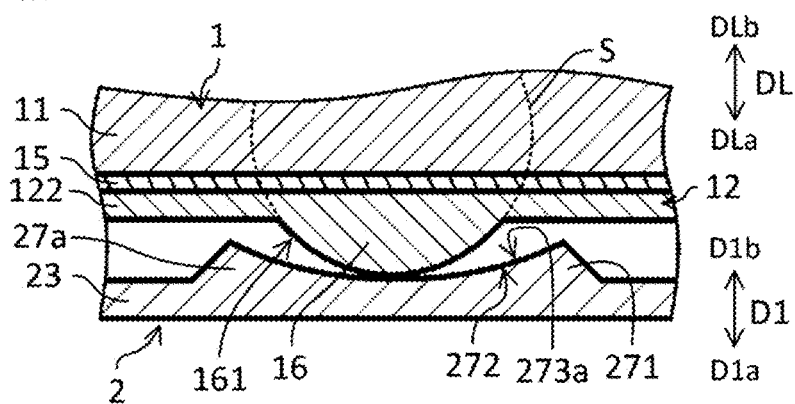
FIG. 6A is a first modification of a support portion.
Figure 6B:
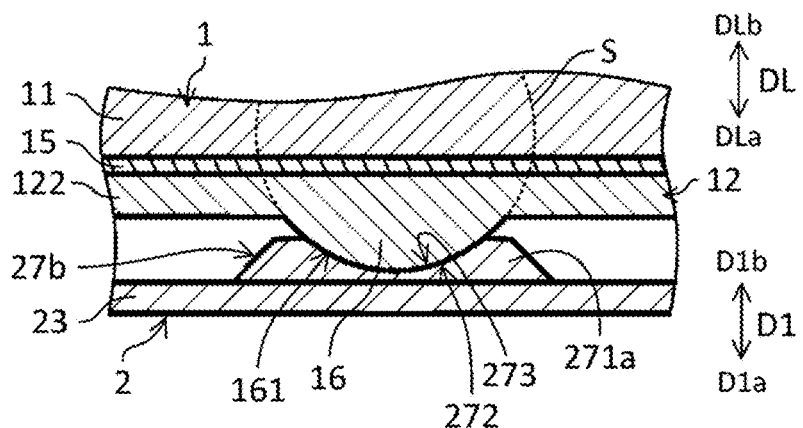
FIG. 6B is a second modification of the support portion.
Figure 6C:
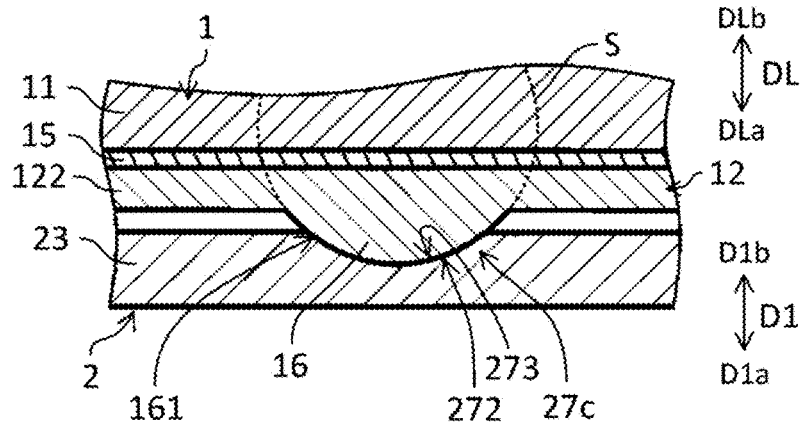
FIG. 6C is a third modification of the support portion.

Next, a modification of the support portion 27 will be described with reference to FIGS. 6A to 6C. FIG. 6A is a first modification of the support portion 27. FIG. 6B is a second modification of the support portion 27. FIG. 6C is a third modification of the support portion 27. Note that each of FIGS. 6A to 6C corresponds to, for example, an enlarged view of the vicinity of the second support mechanism Ms2 in the cross-sectional view of FIG. 3, and illustrates a cross-sectional structure in a state in which the movable portion 1 is stationary.

A curvature radius of the second curved surface 273 is the same as a curvature radius of the first curved surface 161 in FIG. 4. However, the present invention is not limited to this example, and a curvature radius of a second curved surface 273a of the support portion 27 may be larger than the curvature radius of the first curved surface 161 as illustrated in FIG. 6A. That is, the curvature radius of the second curved surface 273 or 273a may be equal to or larger than the curvature radius of the first curved surface 161. Then, when the movable portion 1 rotates with respect to the support portion 27 of the fixed portion 2, the first curved surface 161 of the protrusion 16 can smoothly move on the second curved surface 273 or 273a while being in contact with the second curved surface 273 or 273a of the recess 272. Note that the present invention is not limited to the above example, and the curvature radius of the second curved surface 273 may be smaller than the curvature radius of the first curved surface 161. In this case, for example, the first curved surface 161 may be in contact with the other end in the first direction of the recess 272 and is not necessarily in contact with the inner surface of the recess 272.

In FIGS. 4 to 6A, the support portion 27 is a different part of the same material as the bottom cover 23. However, the present invention is not limited to this example, and a support portion 27b may be a separate body from the bottom cover 23 as illustrated in FIG. 6B. For example, a base 271a of the support portion 27b may be pasted to the other end surface in the first direction of the bottom cover 23 using an adhesive or the like, or may be fixed to the other end surface in the first direction of the bottom cover 23 using an attachment member (not illustrated). Then, the support portion 27b is not necessarily formed on the bottom cover 23 by precision processing. For example, it is unnecessary to form the above-described partial shape of the spherical surface S on the bottom cover 23. Therefore, the fixed portion 2 can be easily manufactured.

In FIGS. 4 to 6B, the support portion 27, 27a, or 27b includes the base 271 or 271a. However, the present invention is not limited to these examples, and the base 271 or 271a may be omitted. For example, a support portion 27c may be the recess 272 itself arranged on the other end surface in the first direction of the bottom cover 23 as illustrated in FIG. 6C. Then, for example, the support portion 27c can be arranged only by forming the recess 272 on the other end surface in the first direction of the bottom cover 23. Therefore, the fixed portion 2 can be easily manufactured.

Next, first to fourth modifications of the embodiment will be described. Hereinafter, configurations different from the above-described embodiment and other modifications will be described. Further, components similar to those of the above-described embodiment and other modifications are denoted by the same reference signs, and the description of similar configurations and similar components will be sometimes omitted. Further, the embodiment and the first to fourth modifications thereof can be arbitrarily combined as long as there is no particular contradiction.

Figure 7:
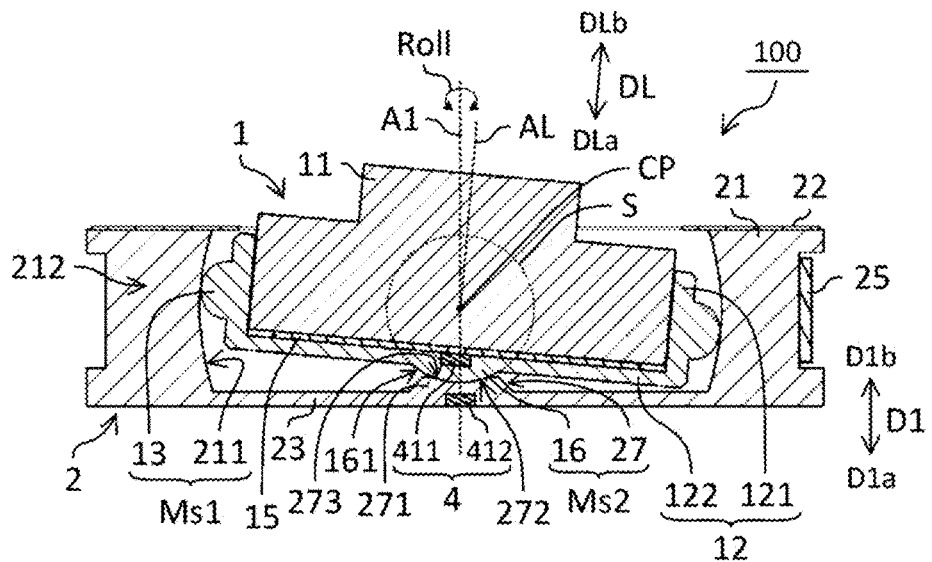
FIG. 7 is a cross-sectional view of an optical unit according to a first modification of the embodiment taken along line B-B.
Figure 8:
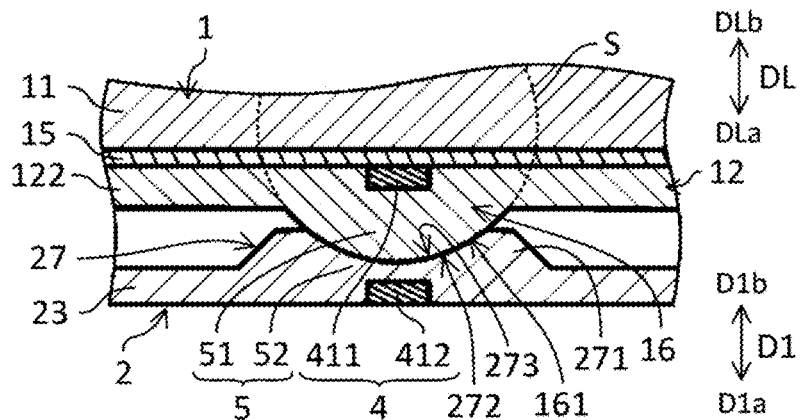
FIG. 8 is a cross-sectional view illustrating a configuration example of a second support mechanism according to a first modification of the embodiment.

The first modification of the embodiment will be described with reference to FIGS. 7 and 8. FIG. 7 is a cross-sectional view of the optical unit 100 according to the first modification of the embodiment. FIG. 8 is a cross-sectional view illustrating a configuration example of the second support mechanism Ms2 according to the first modification of the embodiment. Note that FIG. 7 corresponds to the cross-sectional view taken along the alternate long and short dash line B-B in FIG. 1, and illustrates a cross-sectional structure of the optical unit 100 in the case of being cut along a virtual plane including the first axis A1 and the alternate long and short dash line B-B. In FIG. 7, the movable portion 1 is inclined in the pitching direction and/or the yawing direction. Further, FIG. 8 corresponds to, for example, an enlarged view of the vicinity of the second support mechanism Ms2 in the cross-sectional view of FIG. 7 and illustrates a cross-sectional structure in a state in which the movable portion 1 is stationary. As described above, the sign of the rolling direction is "Roll" in FIG. 7.

In the first modification, the optical unit 100 further includes a separation suppressing portion 4. The separation suppressing portion 4 is arranged on at least one of the movable portion 1 and the fixed portion 2. The separation suppressing portion 4 suppresses separation of the protrusion 16 from the support portion 27. Since the separation suppressing portion 4 is arranged in the optical unit 100, the support of the protrusion 16 by the support portion 27 is maintained even if a force directed in a direction separated from the support portion 27 acts on the movable portion 1 due to, for example, an impact, a sudden orientation change, or the like. Therefore, the optical unit 100 can stably correct the shake of the optical module 11.

Figure 9:
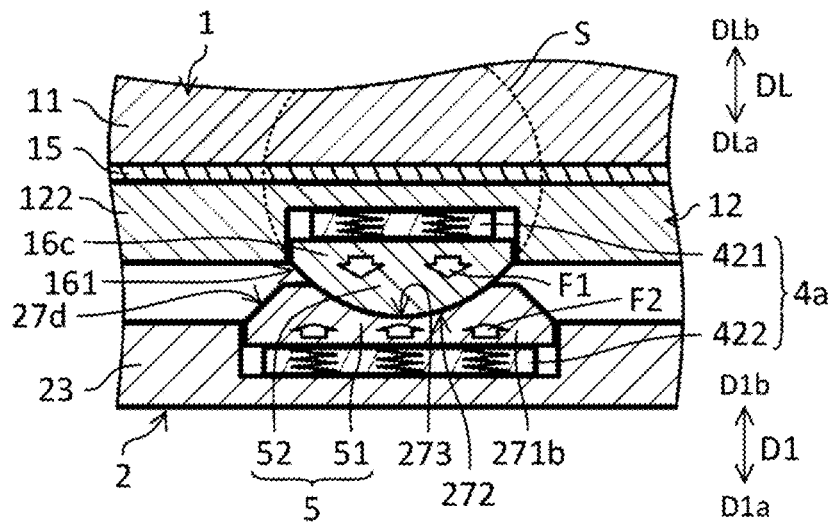
FIG. 9 is a cross-sectional view illustrating a configuration example of a second support mechanism according to a second modification of the embodiment.
Figure 10:
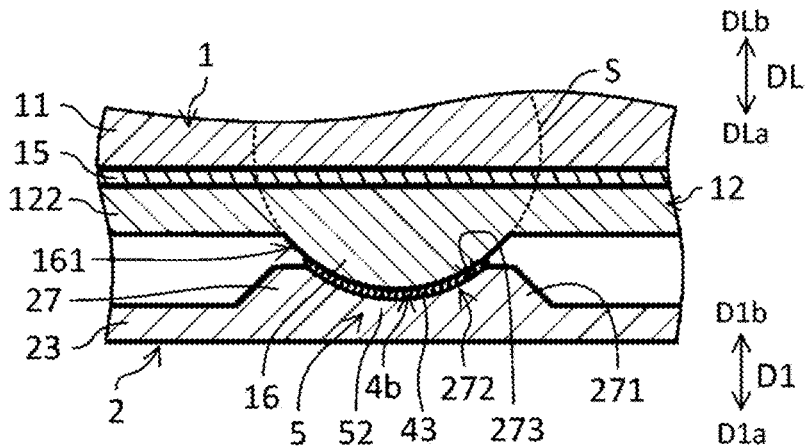
FIG. 10 is a cross-sectional view illustrating a configuration example of a second support mechanism according to a third modification of the embodiment.

In FIGS. 7 and 8, the separation suppressing portion 4 includes a first magnet 411 arranged on the movable portion 1 and a second magnet 412 arranged on the fixed portion 2. Specifically, the first magnet 411 is arranged on the bottom plate portion 122 of the holder 12. The second magnet 412 is arranged on the bottom cover 23. The first magnet 411 and the second magnet 412 attract each other. Then, it is difficult for the protrusion 16 to separate from the support portion 27. Therefore, it is possible to maintain the support of the protrusion 16 by the support portion 27. Further, in the configuration of FIGS. 7 and 8 in which the separation suppressing portion 4 includes the first magnet 411 and the second magnet 412, a frictional force between the protrusion 16 and the support portion 27, which acts when the protrusion 16 rotates with respect to the support portion 27, can be further reduced as compared with other configurations in which the separation suppressing portion 4 has a different form as illustrated in FIGS. 9 and 10 to be described later. Typically, the first magnet 411 and the second magnet 412 at least partially overlap each other when viewed from the optical axis direction. Preferably, the entire surfaces of the first magnet 411 and the second magnet 412 overlap each other when viewed from the optical axis direction as illustrated in FIG. 8. As a result, a stable magnetic attraction force can be obtained. Note that the two magnets of the first magnet 411 and the second magnet 412 attract each other in the present embodiment, but one of them may be a magnetic body.

The optical unit 100 further includes a friction buffer 5 made of a highly slidable material. In FIGS. 7 and 8, the friction buffer 5 includes a first friction buffer 51 and a second friction buffer 52. The first friction buffer 51 is arranged on the protrusion 16 of the movable portion 1 and is in contact with the first friction buffer 51 so as to be movable. The second friction buffer 52 is arranged on the support portion 27 of the fixed portion 2. That is, the protrusion 16 has the first friction buffer 51. The support portion 27 has the second friction buffer 52 in contact with the first friction buffer 51. The first friction buffer 51 and the second friction buffer 52 are made of the highly slidable material, and are arranged between the first magnet 411 and the second magnet 412. For example, the first friction buffer 51 is arranged at a portion including the first curved surface 161 at the one end in the optical axis direction of the protrusion 16. The second friction buffer 52 is arranged at a portion including the second curved surface 273 at the other end in the optical axis direction of the base 271.

Thus, the first friction buffer 51 on the movable portion 1 side is in contact with the second friction buffer 52 on the fixed portion 2 side at a portion where the protrusion 16 is in contact with the support portion 27. Therefore, the friction between the protrusion 16 and the support portion 27 can be effectively reduced. Thus, when the protrusion 16 rotates with respect to the support portion 27, the friction between the both can be further reduced as compared with a configuration in which the first magnet 411 and the second magnet 412 are in direct contact with each other between the protrusion 16 and the support portion 27.

Note that the present invention is not limited to the examples of FIGS. 7 and 8, and one of the protrusion 16 and the support portion 27 may have the friction buffer 5 made of a highly slidable material. That is, the friction buffer 5 may be arranged on only one of the protrusion 16 and the support portion 27. For example, the friction buffer 5 may include one of the first friction buffer 51 and the second friction buffer 52 and does not necessarily include the other. In this case, the friction buffer 5 arranged on one of the protrusion 16 and the support portion 27 is in contact with the other of the protrusion 16 and the support portion 27, and is arranged between the first magnet 411 and the second magnet 412. Then, the friction buffer 5 made of the highly slidable material is arranged on one of the protrusion 16 and the support portion 27 and is in contact with the other. That is, the first magnet 411 on the movable portion 1 side and the second magnet 412 on the fixed portion 2 side are not in direct contact with each other. Therefore, the friction between the protrusion 16 and the support portion 27 can be reduced. Thus, when the protrusion 16 rotates with respect to the support portion 27, the friction between the both can be further reduced as compared with a configuration in which the first magnet 411 and the second magnet 412 are in direct contact with each other between the protrusion 16 and the support portion 27.

A material having a low friction coefficient and excellent wear resistance is used for the friction buffer 5, the first friction buffer 51, and the second friction buffer 52. For example, elastomer resins such as polyoxymethylene (POM), polyamide (PA), polytetrafluoroethylene (PTFE), polyphenylene sulfide (PPS), polyester, and urethane, polyolefin resin materials, and the like can be adopted.

Next, the second modification of the embodiment will be described with reference to FIG. 9. FIG. 9 is a cross-sectional view illustrating a configuration example of the second support mechanism Ms2 according to the second modification of the embodiment. Note that FIG. 9 corresponds to, for example, an enlarged view of the vicinity of the second support mechanism Ms2 in the cross-sectional view of FIG. 7, and illustrates a cross-sectional structure in a state in which the movable portion 1 is stationary.

In the second modification, a protrusion 16c of the movable portion 1 is movable in the optical axis direction DL. A separation suppressing portion 4a includes a first elastic portion 421 arranged in the movable portion 1. Specifically, the first elastic portion 421 is arranged closer to the other side in the optical axis direction DLb side than the protrusion 16c at one end in the optical axis direction of the movable portion 1. In the first direction D1, the protrusion 16c is sandwiched between a support portion 27d and the first elastic portion 421.

The first elastic portion 421 exhibits high elasticity at least in the optical axis direction DL. Therefore, when the support portion 27d comes into contact with the protrusion 16c to support the movable portion 1, the first elastic portion 421 applies a first elastic force F1 directed to the support portion 27d to the protrusion 16c. With such a configuration, the protrusion 16c can maintain contact with the support portion 27d by the first elastic force F1 without separating from the support portion 27d even when a force directed in a direction separated from the support portion 27d is applied to the movable portion 1 due to an impact, a sudden orientation change or the like, for example. That is, the protrusion 16c is hardly separated from the support portion 27d, and thus, the optical unit 100 can stably maintain the support of the protrusion 16c by the support portion 27d.

In FIG. 9, the protrusion 16c is a separate body from the bottom plate portion 122. However, the present invention is not limited to this example, and the protrusion 16c may be a different part of the same member as the bottom plate portion 122. Such a structure can be realized, for example, when the first elastic portion 421 is integrally molded with the bottom plate portion 122 at the time of manufacturing the holder 12 and a connection portion between the protrusion 16c and the bottom plate portion 122 has high elasticity.

Further, the support portion 27d of the fixed portion 2 is movable in the first direction D1. The separation suppressing portion 4a further includes a second elastic portion 422 arranged in the fixed portion 2. Specifically, the second elastic portion 422 is arranged closer to the one side in the first direction D1a than the support portion 27d in the bottom cover 23. In the first direction D1, the support portion 27d is sandwiched between the protrusion 16 and the second elastic portion 422.

The second elastic portion 422 exhibits high elasticity at least in the optical axis direction DL. Therefore, the second elastic portion 422 applies a second elastic force F2 directed to the protrusion 16c to the support portion 27d when the support portion 27d comes into contact with the protrusion 16c to support the movable portion 1. With such a configuration, the support portion 27d can maintain contact with the protrusion 16a by the second elastic force F2 without separating from the protrusion 16a even when the force directed in the direction separated from the support portion 27d is applied to the movable portion 1 due to an impact, a sudden orientation change or the like, for example. That is, the support portion 27d is hardly separated from the protrusion 16a, and thus, the optical unit 100 can stably maintain the support of the protrusion 16a by the support portion 27d.

In FIG. 9, the support portion 27d is provided as a separated body from the bottom cover 23. However, the support portion 27d is not limited to this example, and the support portion 27d may be a different part of the same member as the bottom cover 23. Such a structure can be realized, for example, when the second elastic portion 422 is integrally molded with the bottom cover 23 at the time of manufacturing the fixed portion 2, and a connection portion between the base 271b of the support portion 21d and the bottom cover 23 has high elasticity.

For the first elastic portion 421 and the second elastic portion 422, a leaf spring, a single or a plurality of spring coils that elastically deform in the optical axis direction DL, or the like can be used. However, this example does not exclude a configuration in which the first elastic portion 421 and the second elastic portion 422 are elastic members other than a leaf spring and a spring coil.

In FIG. 9, the separation suppressing portion 4a includes both the first elastic portion 421 and the second elastic portion 422. However, the present invention is not limited to this example, and the separation suppressing portion 4a may include one of the first elastic portion 421 and the second elastic portion 422 and does not necessarily include the other. Even in this case, the support portion 27d is hardly separated from the protrusion 16a by the first elastic force F1 or the second elastic force F2, and thus, the optical unit 100 can stably maintain the support of the protrusion 16a by the support portion 27d.

Next, the third modification of the embodiment will be described with reference to FIG. 10. FIG. 10 is a cross-sectional view illustrating a configuration example of the second support mechanism Ms2 according to the third modification of the embodiment. Note that FIG. 10 corresponds to, for example, an enlarged view of the vicinity of the second support mechanism Ms2 in the cross-sectional view of FIG. 7, and illustrates a cross-sectional structure in a state in which the movable portion 1 is stationary.

In the third modification, the optical unit 100 further includes a viscous body 43. The separation suppressing portion 4 includes the viscous body 43. The viscous body 43 is arranged between the protrusion 16 and the support portion 27. Specifically, a distal end of the protrusion 16 is accommodated in the recess 272 filled with the viscous body 43. The first curved surface 161 of the protrusion 16 is in contact with the second curved surface 273 of the support portion 27 via the viscous body 43. The same viscous body 43 which can flow with a predetermined viscosity adheres to the first curved surface 161 of the protrusion 16 and the second curved surface 273 of the support portion 27, so that the protrusion 16 is hardly separated from the support portion 27 even if a force directed in a direction separated from the support portion 27 acts on the movable portion 1 due to, for example, an impact, a sudden orientation change, or the like.

Therefore, the support portion 27 can maintain contact with the protrusion 16. For example, grease or the like can be used for the viscous body 43. However, this example does not exclude a configuration in which the viscous body 43 other than grease is used.

Figure 11:
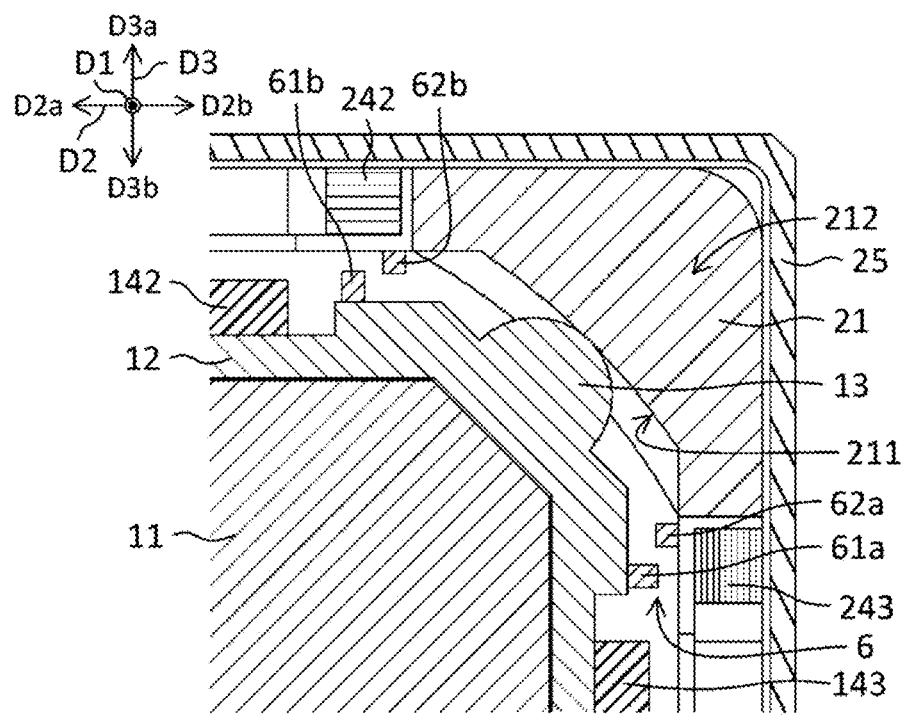
FIG. 11 is a plan view illustrating an arrangement example of a rotation suppressing portion.

Next, the fourth modification of the embodiment will be described. The rotation of the movable portion 1 in the rolling direction can also be suppressed to some extent by the first magnetic drive mechanism M1. However, when the movable portion 1 greatly rotates in the rolling direction, there is a possibility that it is difficult to suppress the rotation with the first magnetic drive mechanism M1. In consideration of such a case, the optical unit 100 further includes a rotation suppressing portion 6 in the fourth modification of the embodiment. FIG. 11 is a plan view illustrating an arrangement example of the rotation suppressing portion 6. In FIG. 11, the vicinity of the first support mechanism Ms1 is viewed from the first direction D1.

In FIG. 11, the rotation suppressing portion 6 includes a pair of first rotation suppressing portions 61a and 61b, and a pair of second rotation suppressing portions 62a and 62b.

The pair of first rotation suppressing portions 61a and 61b are arranged at the radially outer end of the holder 12 of the movable portion 1. One first rotation suppressing portion 61a comes into contact with the frame body 21 of the fixed portion 2 when the movable portion 1 rotates at a predetermined rotation angle in one rolling direction with respect to the fixed portion 2.

Alternatively, at this time, the one first rotation suppressing portion 61a may be in contact with one second rotation suppressing portion 62a. The other first rotation suppressing portion 61b comes into contact with the frame body 21 of the fixed portion 2 when the movable portion 1 rotates at a predetermined rotation angle in the other rolling direction with respect to the fixed portion 2. Alternatively, at this time, the other first rotation suppressing portion 61b may be in contact with the other second rotation suppressing portion 62b.

The pair of second rotation suppressing portions 62a and 62b are arranged at the radially inner end of the frame body 21 of the fixed portion 2. When the movable portion 1 rotates at a predetermined rotation angle in the one rolling direction with respect to the fixed portion 2, the one second rotation suppressing portion 62a comes into contact with the holder 12 of the movable portion 1. Alternatively, at this time, the one second rotation suppressing portion 62a may be in contact with the one first rotation suppressing portion 61a. The other second rotation suppressing portion 62b comes into contact with the holder 12 of the movable portion 1 when the movable portion 1 rotates at a predetermined rotation angle in the other rolling direction with respect to the fixed portion 2. Alternatively, at this time, the other second rotation suppressing portion 62b may be in contact with the other first rotation suppressing portion 61b.

Note that the present invention is not limited to the example of FIG. 11, and the rotation suppressing portion 6 may include only one of the pair of first rotation suppressing portions 61a and 61b and the pair of second rotation suppressing portions 62a and 62b. That is, one of the frame body 21 and the movable portion 1 may include the rotation suppressing portion 6. Alternatively, the rotation suppressing portion 6 may include at least three of the pair of first rotation suppressing portions 61a and 61b and the pair of second rotation suppressing portions 62a and 62b.

Further, the rotation suppressing portion 6 may be arranged at one place or at a plurality of places. For example, the rotation suppressing portion 6 may be arranged in the vicinity of at least one first support mechanism Ms1.

The rotation suppressing portion 6 can prevent the movable portion 1 from rotating beyond a predetermined rotation angle in the rolling direction. That is, the rotation of the movable portion 1 in the rolling direction can be kept within the predetermined rotation angle range by the rotation suppressing portion 6.

The embodiment of the present invention has been described above. Note that the scope of the present invention is not limited to the above embodiment. The present invention can be implemented by making various modifications to the abovementioned embodiment without departing from the gist of the invention. Further, the matters described in the above embodiment can be arbitrarily combined together, as appropriate, as long as there is no inconsistency.

For example, the configurations illustrated in FIGS. 3 to 6C and FIGS. 8 to 10 can be arbitrarily combined as long as there is no particular contradiction.

The present disclosure is useful for devices in which a fixed portion rotatably supports a movable portion, and is particularly useful for optical devices in which the movable portion has an optical module.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An optical unit for correcting a shake of an optical module, the optical unit comprising:
   a movable portion having a holder that holds the optical module; and
   a fixed portion that rotatably supports the movable portion,
   wherein
   an optical axis direction is a direction in which an optical axis of the optical module extends,
   a first direction is parallel to the optical axis direction in a state in which the movable portion is stationary,
   the movable portion is rotatable with respect to the fixed portion in
      a first rotation direction centered on a first axis extending in the first direction,
      a second rotation direction centered on a second axis extending in a second direction perpendicular to the first direction, and
      a third rotation direction centered on a third axis extending in a third direction perpendicular to the first direction and the second direction, the movable portion further has a protrusion protruding toward the fixed portion from an end, close to the fixed portion, of the holder in the optical axis direction, the fixed portion has a support portion that rotatably supports the protrusion the movable portion further has a plurality of side protrusions protruding from a peripheral wall portion of the holder toward an outer side of the movable portion in a radial direction perpendicular to the optical axis, and the plurality of side protrusions is in contact with a concave surface of the fixed portion and is movable on the concave surface.

2. The optical unit according to claim 1, wherein at least one of the first axis, the second axis, or the third axis passes through the optical axis.

3. The optical unit according to claim 1, wherein the second axis and the third axis are orthogonal to each other on the first axis.

4. The optical unit according to claim 1, wherein the protrusion has a first curved surface that protrudes toward the support portion and is in contact with the support portion, and the first curved surface has a partial shape of a spherical surface.

5. The optical unit according to claim 4, wherein a curvature center of the first curved surface is arranged on the optical axis.

6. The optical unit according to claim 4, wherein a curvature center of the first curved surface is arranged on at least any axis among the first axis, the second axis, and the third axis.

7. The optical unit according to claim 4, wherein the support portion has a recess that is recessed to one side in the first direction and accommodates the protrusion, the one side in the first direction is directed similarly to a side closer to the fixed portion in the optical axis direction in the state in which the movable portion is stationary, the recess has a second curved surface that is recessed to the one side in the first direction and is in contact with the first curved surface, the second curved surface has a partial shape of a spherical surface, and a curvature radius of the second curved surface is equal to or larger than a curvature radius of the first curved surface.

8. The optical unit according to claim 7, wherein a curvature center of the second curved surface is located at an identical position as a curvature center of the first curved surface.

9. The optical unit according to claim 1, wherein the support portion has a recess that is recessed to one side in the first direction and accommodates the protrusion, and the one side in the first direction is directed similarly to a side closer to the fixed portion in the optical axis direction in the state in which the movable portion is stationary.

10. The optical unit according to claim 9, wherein the recess has a second curved surface that is recessed to the one side in the first direction and is in contact with the protrusion, and the second curved surface has a partial shape of a spherical surface.

11. The optical unit according to claim 10, wherein a curvature center of the second curved surface is arranged on the optical axis.

12. The optical unit according to claim 10, wherein a curvature center of the second curved surface is arranged on at least any axis among the first axis, the second axis, and the third axis.

13. The optical unit according to claim 9, wherein the support portion further has a base protruding toward the movable portion, and the recess is arranged on the base.

14. The optical unit according to claim 1, wherein the protrusion is a member different from the holder.

15. The optical unit according to claim 1, wherein the protrusion is made of resin.

16. The optical unit according to claim 1, wherein the movable portion has driving magnets at a same height as the plurality of side protrusions in the optical axis direction.

17. The optical unit according to claim 16, wherein each of the plurality of side protrusions is arranged between two adjacent driving magnets in the first rotation direction.

18. The optical unit according to claim 1, wherein the peripheral wall portion has a tubular shape extending in the optical axis direction, the peripheral wall portion is a rectangular frame-shaped member when viewed from the optical axis direction and includes corner portions, and the plurality of side protrusions is arranged at a radially outer side surface of the corner portions.

19. The optical unit according to claim 18, wherein the movable portion has driving magnets at a same height as the plurality of side protrusions in the optical axis direction.

20. The optical unit according to claim 1, wherein each of the plurality of side protrusions is configured to move on the concave surface while being in contact with the concave surface to allow the movable portion to rotate with respect to the fixed portion while being kept supported by the fixed portion.

* * * * *